United States Patent
Lamb et al.

(10) Patent No.: US 9,503,381 B2
(45) Date of Patent: Nov. 22, 2016

(54) SYSTEM AND METHOD FOR CARRYING CONTROL DATA IN A PREAMBLE

(71) Applicant: Broadcom Corporation, Irvine, CA (US)

(72) Inventors: Lowell David Lamb, San Ramon, CA (US); Glen Kramer, Petaluma, CA (US); Lawrence Drew Davis, Petaluma, CA (US)

(73) Assignee: BROADCOM CORPORATION, Irvine, CA (US)

( * ) Notice: Subject to any disclaimer, the term of this patent is extended or adjusted under 35 U.S.C. 154(b) by 166 days.

(21) Appl. No.: 13/784,039

(22) Filed: Mar. 4, 2013

(65) Prior Publication Data
US 2014/0205295 A1  Jul. 24, 2014

Related U.S. Application Data

(60) Provisional application No. 61/755,751, filed on Jan. 23, 2013.

(51) Int. Cl.
*H04L 12/857* (2013.01)

(52) U.S. Cl.
CPC .................. *H04L 47/2491* (2013.01)

(58) Field of Classification Search
CPC ........... H04L 47/24; H04Q 2011/0077; H04J 3/1652
USPC ......................................................... 398/66
See application file for complete search history.

(56) References Cited

U.S. PATENT DOCUMENTS

| | | | | |
|---|---|---|---|---|
| 6,023,467 | A * | 2/2000 | Abdelhamid et al. | 370/236.2 |
| 7,424,229 | B2 * | 9/2008 | Effenberger | 398/194 |
| 8,249,104 | B2 * | 8/2012 | Effenberger et al. | 370/471 |
| 8,837,945 | B2 * | 9/2014 | Kwon et al. | 398/72 |
| 2006/0136715 | A1 * | 6/2006 | Han et al. | H04L 63/126 713/151 |
| 2008/0002976 | A1 * | 1/2008 | Tal et al. | H04J 3/1694 398/58 |
| 2008/0095535 | A1 * | 4/2008 | Zou | H04Q 11/0067 398/58 |
| 2008/0253770 | A1 * | 10/2008 | Mori | H04J 3/1694 398/59 |
| 2009/0245790 | A1 * | 10/2009 | Mizutani et al. | H04J 14/0282 398/43 |
| 2009/0252492 | A1 * | 10/2009 | Sone et al. | 398/49 |
| 2010/0040369 | A1 * | 2/2010 | Zhao et al. | 398/58 |
| 2010/0074628 | A1 * | 3/2010 | Murakami et al. | H04L 12/66 398/182 |
| 2010/0150554 | A1 * | 6/2010 | Mizutani et al. | H04Q 11/0067 398/58 |
| 2012/0106956 | A1 * | 5/2012 | Rao et al. | H04J 3/12 398/52 |
| 2012/0128349 | A1 * | 5/2012 | Mitsunaga et al. | H04J 14/0247 398/25 |
| 2012/0141139 | A1 * | 6/2012 | Bakhru et al. | H04B 10/272 398/158 |

* cited by examiner

*Primary Examiner* — Shaq Taha
(74) *Attorney, Agent, or Firm* — Foley & Lardner LLP; Christopher J. McKenna; Helen H. Zhang

(57) ABSTRACT

A system and method for carrying control data in a preamble. A control-data bearing preamble is defined to facilitate end-to-end labeling and control-data transport. This control-data bearing preamble provides a unified labeling scheme with minimal overhead, which facilitates greater ease in parsing. The control-data bearing preamble can be converted to/from other control/labeling schemes at the edge of the control-data bearing preamble aware portion of the network.

19 Claims, 4 Drawing Sheets

SYSTEM AND METHOD FOR CARRYING CONTROL DATA IN A PREAMBLE

This application claims priority to provisional application No. 61/755,751, filed Jan. 23, 2013, which is incorporated herein by reference in its entirety.

BACKGROUND

Field of the Invention

The present invention relates generally to networking and, more particularly, to a system and method for carrying control data in a preamble.

INTRODUCTION

Data communication networks continue to expand in reach and capacity. The continual evolution of data communication networks presents continuing challenges in coordinating the transport of various forms of network traffic from various sources. Interconnection of customer networks (e.g., residential), access networks, and metro/core networks presents significant challenges in addressing the various quality of service (QoS) domains represented.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
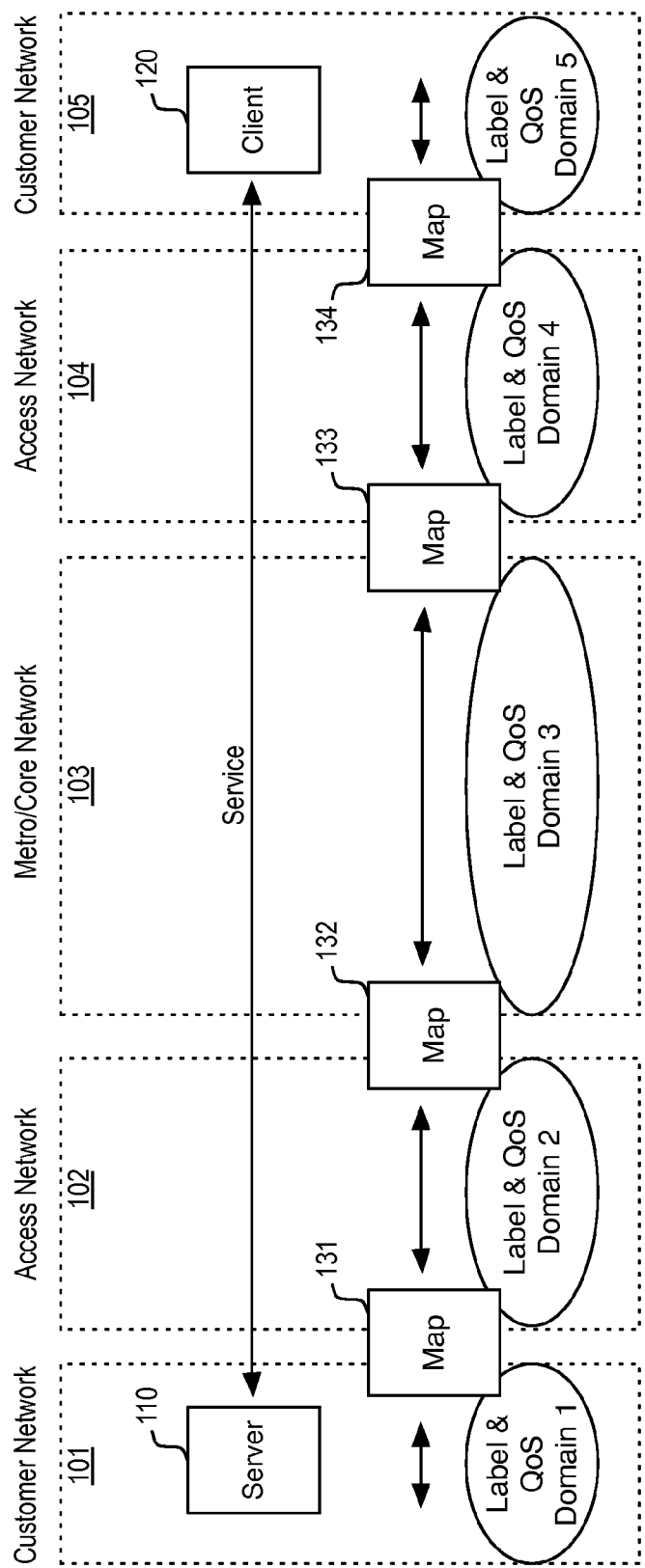
FIG. 1 illustrates an example of communication across multiple QoS domains.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Customer networks, access networks, and metro/core networks provide a transport framework for today's data communications needs. Various network labeling schemes such as multiprotocol label switching (MPLS), virtual local area networks (VLANs), stacked VLANs, MAC-in-MAC, etc. that are used in such networks can add significant overhead. As a consequence, the multiple label-mapping stages can add significant overhead and cost.

In accordance with the present invention, a control-data bearing preamble is defined to facilitate end-to-end labeling and control-data transport. This control-data bearing preamble can provide a unified labeling scheme with minimal overhead, which facilitates greater ease in control data parsing. The control-data bearing preamble can be converted to/from other control/labeling schemes at the edge of the control-data bearing preamble aware portion of the network. As an example, the use of the control-data bearing preamble in the metro/core portion of the network allows one-for-one mapping of labeling schemes used in an access portion of the network (e.g., EPON).

In one embodiment, a first Ethernet frame having a preamble that includes control data associated with network traffic contained within the first Ethernet frame is received in a first network node in an access network. The first network node can then transmit a second Ethernet frame based on the first Ethernet frame to a second network node in a metro/core network, wherein the second Ethernet frame has a preamble that includes at least part of the control data included in the preamble of the first Ethernet frame. End-to-end labeling for the network traffic across the access and metro/core networks is thereby facilitated. In various examples, the control data in the preamble of the Ethernet frame can identify a data flow, a packet sequence number, time critical control information (e.g., protection switching, synchronization, etc.), etc. More generally, the control data in the preamble of the Ethernet frame can provide an out-of-band management channel.

In another embodiment, intermediate nodes in the control-data bearing preamble aware portion of the network can modify the control data in the preamble of the Ethernet frame. In one example, a first Ethernet frame having a first preamble that includes first control data associated with network traffic contained within the first Ethernet frame is received by a first network node. The first network node can then modify the contents of the first preamble to produce a second preamble, wherein the modified contents includes second control data associated with the network traffic contained within the first Ethernet frame, the second control data being different from the first control data. Next, the first network node transmits a second Ethernet frame based on the first Ethernet frame to a second network node, wherein the second Ethernet frame includes the second preamble having the second control data associated with the network traffic.

To further illustrate the features of the present invention, reference is made first to FIG. 1 which illustrates an example of communication across multiple QoS domains. As illustrated, an end-to-end service is provided that couples server 110 in customer network 101 to client 120 in customer network 105. This end-to-end service traverses various transport networks such as access network 102, metro/core network 103, and access network 104. As would be appreciated, the particular form of the individual networks 101-105 can vary. In various examples, customer networks 101, 105 can represent residential or business networks, access networks 102, 104 can represent passive optical network (PON), Data Over Cable Service Interface Specification (DOCSIS), Wi-Fi, etc. networks, and metro/core network 103 can represent a carrier network. Regardless of the particular implementation within a particular network 101-105, each such network can represent a different label and QoS domain.

To facilitate transport between each adjacent pair of the various networks 101-105, a mapping function is provided at the interface between adjacent networks. As illustrated, mapper 131 provides a mapping function between customer network 101 and access network 102, mapper 132 provides a mapping function between access network 102 and metro/core network 103, mapper 133 provides a mapping function between metro/core network 103 and access network 104, and mapper 134 provides a mapping function between access network 104 and customer network 105.

The illustration of mappers 131-134 in FIG. 1 is representative of a functional block that can be performed by one or more network nodes at the interface between two networks. Consider, for example, a PON-based access network. In this example, the functionality of mapper 131 between customer network 101 and access network 102 can be implemented by an optical network unit (ONU), which includes a switching subsystem as part of its service-specific function. This switching subsystem facilitates a connection of the ONU to a client-facing network via a plurality of network interfaces that are designed to support a plurality of subscriber connections. The functionality of mapper 132, on the other hand, can be implemented by an optical line terminal (OLT). In a point-to-multipoint system such as PON, a single OLT at a head end can be designed to communicate with a plurality of ONUs at various end nodes.

In this example of a PON-based access network, the labeling and QoS domain is facilitated by a logical link identifier (LLID) that is assigned by an OLT to an ONU. This LLID is communicated end-to-end across the PON domain for management of PON services delivered to the ONU. At the OLT, the LLID is removed from the Ethernet traffic prior to delivery of the traffic to the metro/core network.

As this example illustrates, each of the individual networks 101-105 can use different labels to facilitate the individual QoS domains. As such, a stacking of labels can result as traffic traverses the various networks. Such stacking of labels leads to increased overhead and cost.

It is a feature of the present invention that an end-to-end labeling scheme is provided using the 8-byte preamble of an Ethernet frame. More specifically, the 8-byte preamble of the Ethernet frame is used to carry control data across various networks in an end-to-end service. A further benefit of transporting control data in the preamble is the reduced processing afforded by the simple parsing of control data at the front-end of the Ethernet frame. As would be appreciated, a conventional Ethernet frame includes a preamble followed by one or more headers and a payload portion.

Figure 2:
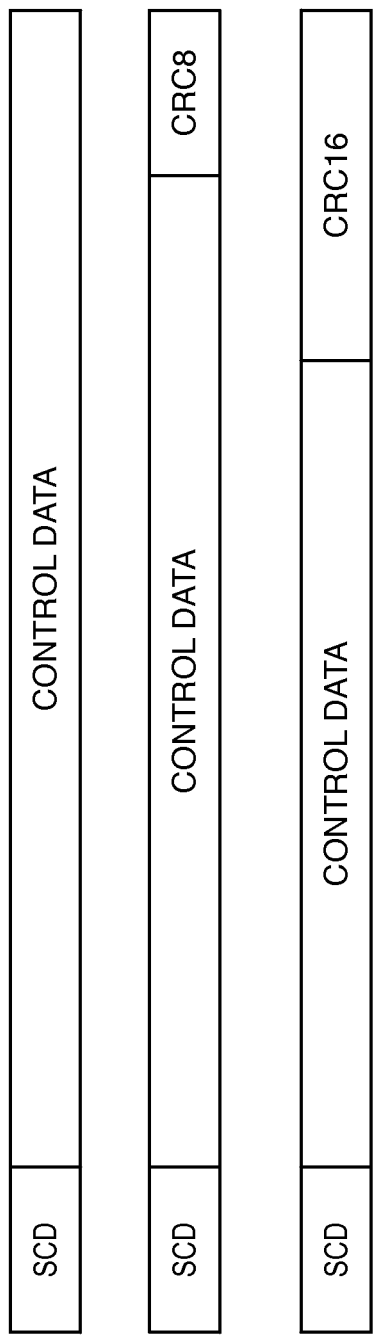
FIG. 2 illustrates example embodiments of a preamble of an Ethernet frame containing control data.

FIG. 2 illustrates example embodiments of a preamble of an Ethernet frame containing control data. As illustrated, the 8-byte preamble can include a single-byte start control data delimiter (SCD), a control data portion spanning a plurality of bytes, and an optional error detecting code portion such as a CRC8 or CRC16 field. As would be appreciated, the particular format of the preamble of the Ethernet frame can vary. Regardless of the format, the inclusion of one or more bytes of control data enables end-to-end labeling or other control-data transport in facilitating a control-data preamble aware portion of the network.

Figure 3:
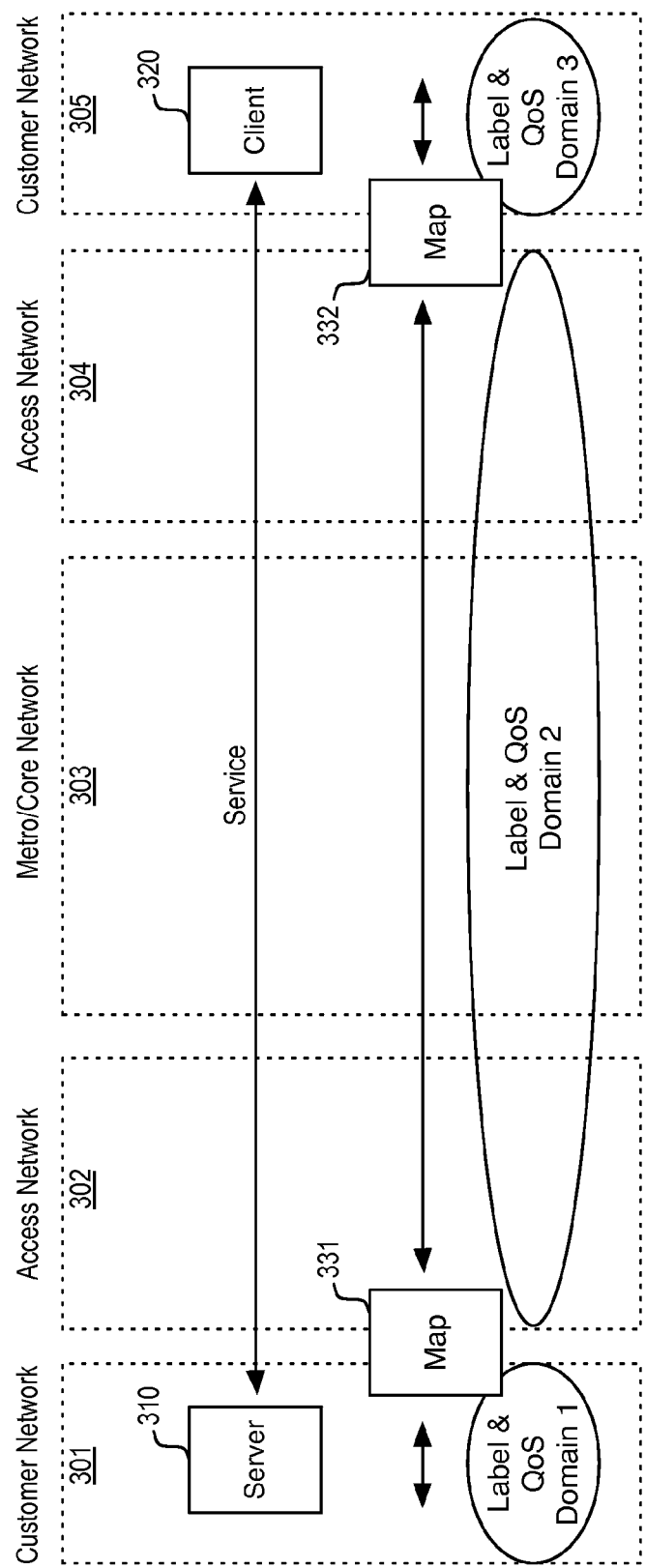
FIG. 3 illustrates an example of a control data bearing preamble aware portion of a network.

FIG. 3 illustrates an example of a control-data bearing preamble aware portion of a network. As illustrated, an end-to-end service is provided that couples server 310 in customer network 301 to client 320 in customer network 305. This end-to-end service traverses various transport networks such as access network 302, metro/core network 303, and access network 304.

To facilitate transport between customer network 301 and access network 302, a mapping function is provided at the interface by mapper 331. At mapper 331, control data can be added to the preamble of the Ethernet frame and passed on to the various intermediate nodes in access network 302, metro/core network 303 and access network 304. Mapper 332 at the interface between access network 304 and customer network 305 can remove the control data from the preamble of the Ethernet frame and pass the Ethernet frame to customer network 305. By adding/removing control data to/from the preamble at mappers 331/332, a single label and QoS domain is created across access network 302, metro/core network 303 and access network 304. This single label and QoS domain effects reduced processing through the low overhead implementation of control data in the preamble of the Ethernet frame. In general, the control-data bearing preamble can be converted to and from other control/labeling schemes such as VLAN tagging, 802.1Q, 802.1ah, MPLS, etc. at the edge of the control-data bearing preamble aware portion of the network.

Unlike the communication of traffic across the multiple label and QoS domains illustrated in FIG. 1, the interfaces between the access networks 302, 304 and metro/core network 303 need not remove, replace, or modify labeling or other control data prior to passage to the next network. A unified labeling scheme across access network 302, metro/core network 303 and access network 304 thereby results. For example, where the control-data bearing preamble is received at an OLT in access network 302, the OLT can simply pass on traffic that retains the control data in the preamble of the Ethernet frame to metro/core network 303. As such, the OLT operates as an intermediary node in the end-to-end service and need not remove, replace, or modify labeling or other control data inserted into the preamble at the interface between customer network 301 and access network 302.

It is a feature of the present invention that the creation of a control-data preamble aware portion of the network enables various control-data based applications to be applied across a network boundary. As would be appreciated, the particular control-data based application that can be facilitated by a control-data bearing preamble would be implementation dependent.

In one example, the control data can be used to identify data flows in a manner similar to MPLS labels. In another example, the control data can be used to carry packet sequence numbers. In another example, the control data can facilitate an out-of-band management channel that can provide support for alarm and failure notifications, encryption key exchange, or any other operations, administration, maintenance, and/or provisioning application. In another example, the control data can facilitate the transport of time-critical control information such as protection switching information, synchronization, or the like.

In yet another example, the control-data bearing preamble can be used to allow for one-to-one mapping of access-network labeling schemes (e.g., PON, DOCSIS, Wi-Fi, etc.) to the metro/core network. For instance, the EPON LLID in the access network can be used in the metro/core network. In another instance, a "super-EPON" format can be defined that is based on an identifier that uniquely specifies the PON port together with the LLID, or a "super-GPON" format can be defined that is based on an identifier that uniquely specifies the PON port together with a GPON-specific ID such as the Alloc_ID or GEM Port ID, or a "super_DOCSIS" format can be defined that is based on an identifier that uniquely specifies the CMTS port together with the SSID.

In general, it is recognized that the large address space afforded by the 8-byte preamble of the Ethernet frame can be used to eliminate the need for stacked labeling (e.g., stacked VLANs, stacked MPLS, etc.) in various applications.

In addition to the forwarding of control data across a network boundary, an intermediate node can also modify the control data contained in the preamble. For instance, consider an example where a labeling scheme is used to determine both the path and the treatment of the Ethernet frames passing through a given node. In one scenario, the intermediate node may modify all or part of the control data to change the path or treatment of the Ethernet frame.

This scenario can be evident in a protected network where both a primary path and a backup path are operational. Here, a frame flow label can instruct intermediate nodes to forward a given FTP packet along the primary path and with high QoS, but when the primary path fails, the node nearest to the failure can replace the label and forward the frame to the backup path. Since the backup path now serves all flows that were originally using this path plus the new flows that were switched over from the primary path, QoS treatment for some flows may change. Table 1 below illustrates an example treatment.

TABLE 1

| Flow (Service) | Before Protection Switching, Label Denotes | After Protection Switching, Label Denotes |
|---|---|---|
| A (VoIP) | Primary Path + High QoS | Secondary Path + High QoS |
| B (FTP) | Primary Path + High QoS | Secondary Path + Low QoS |
| C (VoIP) | Secondary Path + High QoS | Secondary Path + High QoS |
| D (FTP) | Secondary Path + High QoS | Secondary Path + Low QoS |

Figure 4:
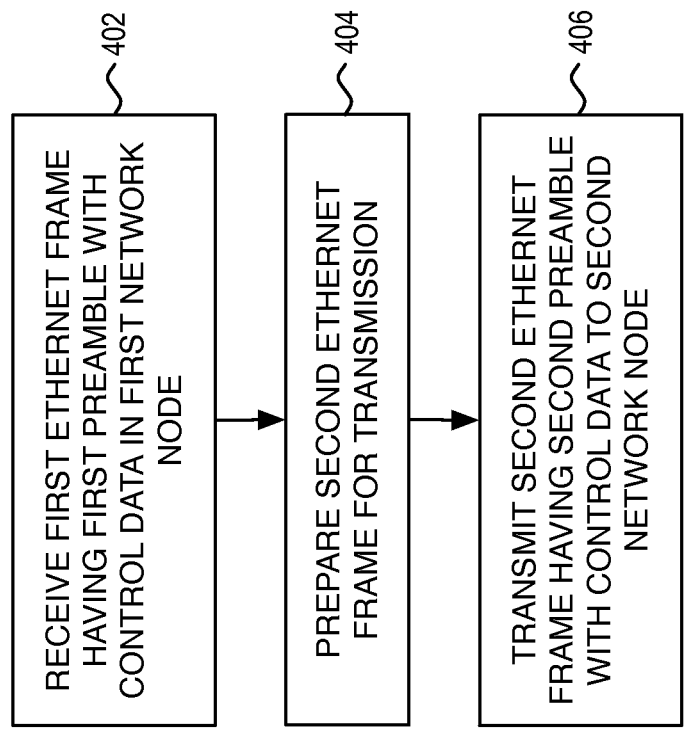
FIG. 4 illustrates an example process of the present invention.

Having described a general framework of operation of a control-data bearing preamble aware portion of a network, reference is now made to FIG. 4, which illustrates a flowchart of a process of the present invention. As illustrated, the process begins at step 402 where a first Ethernet frame having a first preamble that includes control data is received in a first network node. Where the first network node is on an interface between two networks (e.g., access network and metro/core network), the first network node can prepare at step 404 a second Ethernet frame based on the first Ethernet frame for transmission to the second network.

In one example, the control data in the preamble of the first Ethernet frame would be retained in the preamble of the second Ethernet frame. This illustrates a scenario where labeling (e.g., LLID) or other control data application is extended across a network boundary. In another example, the control data in the preamble of the first Ethernet frame is modified at least in part relative to the control data in the preamble of the second Ethernet frame. This scenario illustrates the potential usage of the control-data bearing preamble to facilitate applications such as a protected network or other dynamic traffic handling. Regardless of the particular type and usage of the control data in the preamble, it is significant that the passage of Ethernet traffic across a network boundary retains control data to facilitate a unified label and QoS domain.

After the second Ethernet frame having a second preamble with control data is created, the second Ethernet frame is then transmitted to a second network node at step 406. The passage of control data using the preamble portion of the Ethernet frame thereby facilitates an efficient control data passing mechanism.

In general, the control-data bearing preamble offers an efficient and unambiguous mechanism to construct end-to-end labeling and QoS solutions for services that cross multiple transport boundaries. Significantly, the fixed size and location of the control-data bearing preamble enables the control data information to be easy to parse as compared to embedded labeling schemes that can be nested behind other information.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. An optical line terminal, comprising:
an optical receiver that is configured to communicate with a plurality of optical network units via a point-to-multipoint network, the optical receiver further configured to receive a first Ethernet frame having a first preamble followed by a first header, the first preamble of the first Ethernet frame including first control data associated with network traffic contained within the first Ethernet frame; and
a network interface that is coupled to a network node in a metro or core network, the network interface configured to transmit to the network node in the metro or core network a second Ethernet frame prepared using the first Ethernet frame, the second Ethernet frame having a second preamble followed by a second header, the second preamble being created to retain at least part of the first control data in the first preamble of the first Ethernet frame and to include second control data associated with the network traffic, the second control data being different from the first control data, wherein the first control data and the second control data provide end-to-end labeling for the network traffic.

2. The optical line terminal of claim 1, wherein at least one of the first control data or the second control data identifies a data flow.

3. The optical line terminal of claim 1, wherein at least one of the first control data or the second control data identifies a packet sequence number.

4. The optical line terminal of claim 1, wherein at least one of the first control data or the second control data provides an out-of-band management channel.

5. A method, comprising:
receiving, in a first network node in an access network, a first Ethernet frame having a first preamble followed by a first header, the first preamble of the first Ethernet frame including control data associated with network traffic contained within the first Ethernet frame;
preparing a second Ethernet frame using the first Ethernet frame, the second Ethernet frame having a second preamble followed by a second header, the second preamble of the second Ethernet frame retaining at least part of the control data included in the first preamble of the first Ethernet frame; and transmitting, from the first network node in the access network to a second network node in a metro or core network, the second Ethernet frame having the second preamble,
wherein the control data provides end-to-end labeling for the network traffic.

6. The method of claim 5, wherein the control data provides an out-of-band management channel.

7. The method of claim 5, wherein the control data identifies at least one of a data flow or a packet sequence number.

8. A method, comprising:
receiving, by a first network node, a first Ethernet frame having a first preamble followed by a first header, the first preamble of the first Ethernet frame including first control data associated with network traffic contained within the first Ethernet frame;
modifying, by the first network node, contents of the first preamble to produce a second preamble, the modified contents retaining at least part of the first control data in the first preamble of the first Ethernet frame and including second control data associated with the network traffic contained within the first Ethernet frame, the second control data different from the first control data, wherein the second preamble is followed by a second header in a second Ethernet frame; and
transmitting, by the first network node to a second network node, the second Ethernet frame prepared using the first Ethernet frame, the second Ethernet frame including the second preamble having the at least part of the first control data and the second control data associated with the network traffic,
wherein the first control data provides end-to-end labeling for the network traffic.

9. The method of claim 8, wherein the second control data replaces at least part of the first control data.

10. The method of claim 8, wherein the first control data provides an out-of-band management channel.

11. The method of claim 8, wherein the first control data identifies at least one of a data flow or a packet sequence number.

12. The method of claim 8, wherein the second preamble is an 8-byte preamble.

13. The method of claim 8, wherein the second header is separate from the second preamble.

14. The optical line terminal of claim 1, wherein each of the first preamble and the second preamble is an Ethernet preamble.

15. The optical line terminal of claim 1, wherein the first preamble and the second preamble have a same length.

16. The optical line terminal of claim 1, wherein each of the first preamble and the second preamble is an 8-byte preamble.

17. The optical line terminal of claim 1, wherein the first header is followed by a first payload and the second header is followed by a second payload.

18. The optical line terminal of claim 1, wherein the first Ethernet frame and the second Ethernet frame have a same frame format.

19. The method of claim 5, wherein the second preamble of the second Ethernet frame includes additional control data that is not included in the first preamble of the first Ethernet frame.

* * * * *